(12) United States Patent
Ma

(10) Patent No.: US 9,969,417 B2
(45) Date of Patent: May 15, 2018

(54) STROLLER CAPABLE OF BEING FOLDED TWICE

(71) Applicant: Goodbaby Child Products Co., Ltd., Kunshan, Jiangsu (CN)

(72) Inventor: Fusheng Ma, Jiangsu (CN)

(73) Assignee: Goodbaby Child Products Co., Ltd., Lujia Town, Kunshan, Jiangsu (CN)

( * ) Notice: Subject to any disclaimer, the term of this patent is extended or adjusted under 35 U.S.C. 154(b) by 0 days. days.

(21) Appl. No.: 15/522,124

(22) PCT Filed: Dec. 29, 2014

(86) PCT No.: PCT/CN2014/095422
§ 371 (c)(1),
(2) Date: Apr. 26, 2017

(87) PCT Pub. No.: WO2016/070485
PCT Pub. Date: May 12, 2016

(65) Prior Publication Data
US 2017/0313338 A1  Nov. 2, 2017

(30) Foreign Application Priority Data

Nov. 7, 2014  (CN) .......................... 2014 1 0624297

(51) Int. Cl.
*B62B 7/10*  (2006.01)
(52) U.S. Cl.
CPC ..................... *B62B 7/10* (2013.01)
(58) Field of Classification Search
CPC .... B62B 7/08; B62B 7/12; B62B 3/02; B62B 7/044; B62B 3/144; B62B 2205/20; B62B 7/10; B60N 2/2806; B60N 2/2854; B25H 7/04
See application file for complete search history.

(56) References Cited

U.S. PATENT DOCUMENTS 5,029,886 A * 7/1991 Takahashi ............... B62B 3/001
280/47.11

FOREIGN PATENT DOCUMENTS

| CN | 1406801 | 4/2003 |
|---|---|---|
| CN | 202449034 | 9/2012 |
| CN | 102781759 | 11/2012 |
| CN | 103507846 | 1/2014 |
| CN | 203528555 | 4/2014 |

(Continued)

*Primary Examiner* — John D Walters
*Assistant Examiner* — James J Triggs
(74) *Attorney, Agent, or Firm* — Wayne Edward Ramage; Baker Donelson

(57) ABSTRACT

The present disclosure provides a stroller capable of being folded twice, comprising: side support assemblies located at two sides and at least one transverse brace connected between the side support assemblies of the two sides, the side support assembly at each side comprises a push rod, a front wheel support and a rear wheel support which are rotatably connected to each other, and in a first folded state, the push rod, the front wheel support and the rear wheel support are rotated to be in a closed state; each transverse brace has a first transverse folding rotation point and a second transverse folding rotation point. The stroller is capable of achieving not only a first folding, but also a second folding of the two side support assemblies, so as to reduce the volume occupied by the entire stroller in these states.

19 Claims, 6 Drawing Sheets

(56) References Cited

FOREIGN PATENT DOCUMENTS

| CN | 204196982 | 3/2015 |
|----|-----------|--------|
| GB | 0204465   | 4/2002 |

* cited by examiner

STROLLER CAPABLE OF BEING FOLDED TWICE

CROSS REFERENCE TO RELATED APPLICATIONS

This application is a § 371 National State Application of PCT/CN2014/095422 filed Dec. 29, 2014 which claims priority to CN201410624297.9 filed Nov. 7, 2014, which are hereby incorporated by reference in their entirety.

FIELD OF THE INVENTION

The present disclosure belongs to the field of child products, and particularly, relates to a stroller capable of being folded twice.

BACKGROUND OF THE INVENTION

Products of child stroller have been widely used. It is, indeed, convenient for people to put children into a stroller for a walk. However, people often faces the problem that the whole stroller body occupies a overlarge volume when the stroller is carried or stored, such as the stroller in the normal use state usually cannot be put into the trunk of the vehicle.

In order to solve this problem, many existing strollers possess folding functions, however, these strollers can only achieve being folded once at most. In practice, the stroller capable of being folded in just one direction will still face the problem of occupying an overlong space, which still can not fully meet the user's requirements for the volume.

SUMMARY OF THE INVENTION

Accordingly, the present disclosure provides a stroller capable of being folded twice, which can be folded twice to further reduce the volume occupied in the folded state.

In order to achieve the above purpose, the present disclosure provides a stroller capable of being folded twice and comprising: side support assemblies located at two sides and at least one transverse brace connected between the side support assemblies of the two sides, the side support assembly at each side comprises a push rod, a front wheel support and a rear wheel support which are rotatably connected to each other, and each transverse brace has a first transverse folding rotation point and a second transverse folding rotation point.

When the side support assembly is in a first folded state, the push rod, the front wheel support and the rear wheel support located at the same side are rotated to be in a closed state, and the side support assemblies of the two sides in the first folded state are rotated about the first transverse folding rotation point and the second transverse folding rotation point respectively to get folded and get close to each other in opposite directions.

In a preferred embodiment, the first transverse folding rotation point of the transverse brace is located at an end of the transverse brace, and the second transverse folding rotation point is located between two ends of the transverse brace.

In a preferred embodiment, the side support assemblies of the two sides in the first folded state are rotated about the first transverse folding rotation point and the second transverse folding rotation point in opposite directions respectively to get folded to a second folded state, and in the second folded state, the side support assembly of one side is rotated about the first transverse folding rotation point to get folded and contact with the transverse brace, and the side support assembly of the other side is rotated about the second transverse folding rotation point to get folded and contact with the side support assembly of the one side.

In a preferred embodiment, the first transverse folding rotation point of the transverse brace is located at an end of the transverse brace, and the second transverse folding rotation point is located at the other end of the transverse brace.

In a preferred embodiment, the side support assemblies of the two sides in the first folded state are rotated about the first transverse folding rotation point and the second transverse folding rotation point respectively to get folded in opposite directions to a second folded state, and in the second folded state, the side support assembly of one side is rotated about the first transverse folding rotation point to get folded and contact with the transverse brace, and the side support assembly of the other side is rotated about the second transverse folding rotation point to get folded and contact with the transverse brace.

In a preferred embodiment, both the first transverse folding rotation point and the second transverse folding rotation point of the transverse brace both are located between two ends of the transverse brace.

In a preferred embodiment, distances from the first transverse folding rotation point and the second transverse folding rotation point to adjacent ends thereof are unequal, and the angle between a transverse brace section between the transverse folding rotation point distancing the adjacent end farther and the corresponding adjacent end, and a transverse brace section between the first transverse folding rotation point and the second transverse folding rotation point is not more than 90°.

In a preferred embodiment, the number of the transverse braces connected between the side support assemblies of the two sides is at least two, and in the first folded state, the first transverse folding rotation points of all transverse braces are collinear in a direction perpendicular to the length direction of the transverse brace, and the second transverse folding rotation points of all transverse braces are collinear in a direction perpendicular to the length direction of the transverse brace.

In a preferred embodiment,
a transverse brace is connected between the front wheel supports of the two sides;
and/or;
a transverse brace is connected between the rear wheel supports of the two sides;
and/or;
a transverse brace is connected between the push rods of the two sides.

In a preferred embodiment, the side support assembly of each side further comprises a front wheel support connector of which an end is rotatably connected with a front end of the front wheel support, and a transverse brace is connected between the other ends of the front wheel support connectors of the two sides.

In a preferred embodiment, in the first folded state, the front wheel support connector is turned forwards with respect to the front wheel support.

In a preferred embodiment, the stroller further comprises a rear wheel assembly rotatably connected with the rear wheel support, and in the first folded state, the front wheel assembly and the rear wheel assembly are rotated in opposite directions and get folded to be located between the front wheel support and the rear wheel support which are in the closed state.

In a preferred embodiment, the push rod is a stretchable push rod.

In a preferred embodiment, the push rod, the front wheel support and the rear wheel support of each side are connected via a frame connector, and at least two of the push rod, the front wheel support and the rear wheel support of each side are rotatably connected with the frame connector.

Thus, the strollers provided by the embodiments of the present disclosure are capable of achieving not only a first folding, but also a second folding of the two side support assemblies, so as to reduce the volume occupied by the entire stroller in these states.

BRIEF DESCRIPTION OF THE DRAWINGS

For more clearly explaining the technical solutions in the embodiments of the present disclosure or in the prior art, the accompanying drawings used to describe the embodiments or the prior art are simply introduced in the following. Apparently, the below described drawings merely show a part of the embodiments of the present disclosure, and those skilled in the art can obtain other drawings according to the accompanying drawings without creative work.

DETAILED DESCRIPTION OF THE EXEMPLARY EMBODIMENTS

For clearing the purpose, the technical solutions and advantages of the present disclosure, in the following, the technical solutions in the embodiments of the present disclosure are explained clearly and fully combining with the accompanying drawings, and apparently, the described embodiments are merely a part of the embodiments of the present disclosure, not all of the embodiments. Based on the embodiments of the present disclosure, all other embodiments obtained by one of ordinary skill in the art without creative work belong to the protective scope of the present invention.

Figure 1:
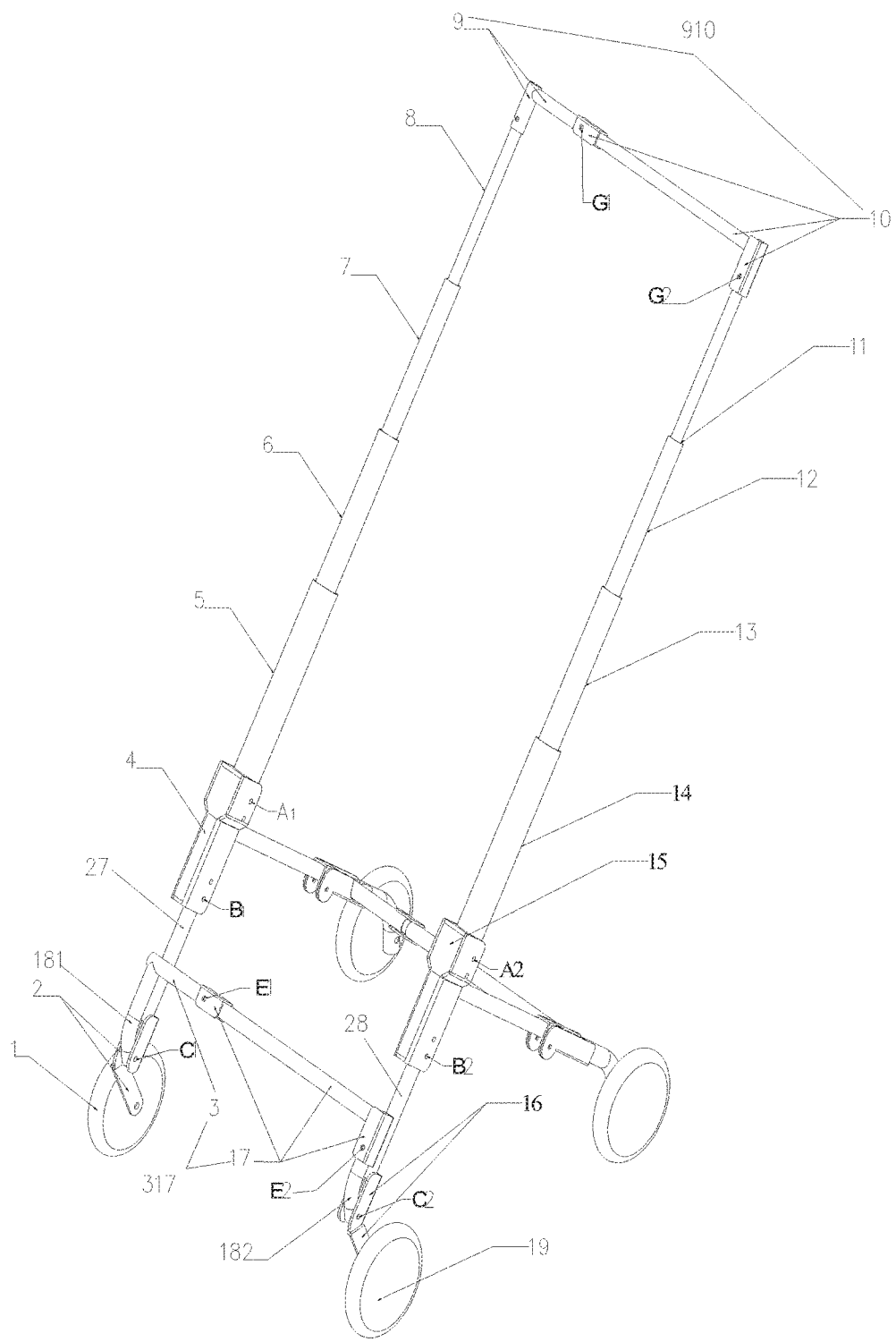
FIG. 1 is a schematic view of a stroller in the use state provided by an embodiment of the present disclosure from an angle.
Figure 2:
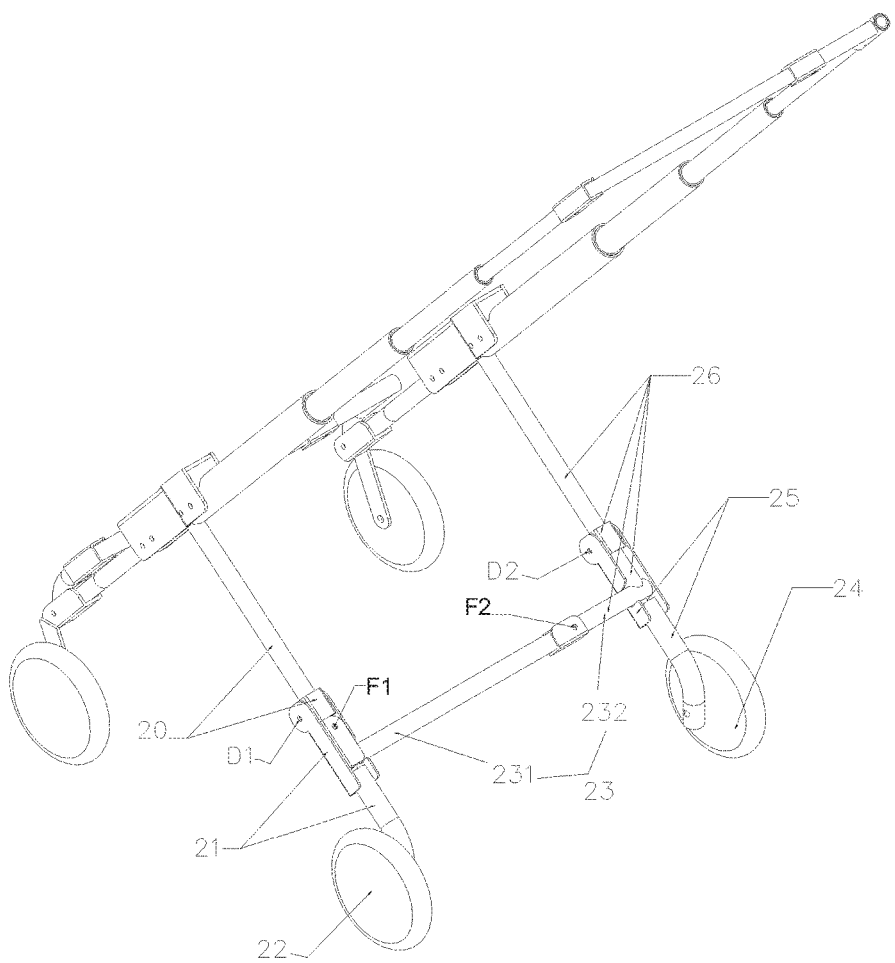
FIG. 2 is a schematic view of the stroller from another angle.

FIG. 1 shows a schematic view of a stroller capable of being folded twice and in the use state provided by an embodiment of the present disclosure from an angle, and FIG. 2 shows a schematic view of the stroller from another angle. The stroller in the use state is in a unfolded state, and the entire stroller may be pushed and used by a user.

The stroller comprises side support assemblies located at two sides and at least one transverse brace connecting the side support assemblies of the two sides. As shown in FIGS. 1 and 2, the side support assembly of each side of the stroller comprises a front wheel support (27, 28), a rear wheel support (26, 20) and a push rod which are rotatably connected to each other. Wherein, the front wheel support 27 and the rear wheel support 26 are located at the same side, and the front wheel support 28 and the rear wheel support 20 are located at the same side. In FIGS. 1 and 2, the push rod specifically employs a length-stretchable push rod, such as a pull-out push rod as shown in FIGS. 1 and 2, and in particular, the push rod of one side consists of pull-out push rods (11, 12, 13, 14), the push rod of the other side consists of pull-out push rods (8, 7, 6, 5), and the pull-out push rods 11, 12 and 13 may be withdrawn into the pull-out push rod 14 with larger diameter, and the pull-out push rods 8, 7 and 6 may be withdrawn into the pull-out push rod 5 with larger diameter. Designing the push rods similar to the length-stretchable push rods in FIGS. 1 and 2 will be more beneficial to further reduce the spatial volume occupied by the entire stroller during the folding process.

In FIGS. 1 and 2, three transverse braces are provided in total, and provided respectively between the front wheel supports of the two sides, between the rear wheel supports of the two sides, and between the push rods of the two sides.

In particular, a rear wheel support transverse brace 23 is connected between the rear wheel support 26 and the rear wheel support 20, and a transverse push handle 910 (also corresponding to a transverse brace) is provided between the pull-out push rods 8 and 11.

In view of that the length of the front wheel support is small when designing an ordinary stroller, front wheel support connectors, such as 181 and 182 shown in FIG. 1, may be rotatably connected to the front end of the front wheel support at each side, specifically via rotation points C1 and C2 which help to achieve the rotatable connection, respectively, and then a transverse brace 317 is provided between the other ends of the front wheel support connectors 181 and 182. In a non-folded state, the front wheel support connectors 181 and 182 get close to respective front wheel support to be used as footrest for children and to enhance the strength of the frame. During the first folding, the front wheel support connectors 181 and 182 may turn forwards with respect to the respective front wheel support 27, 28, to achieve the purpose of extending the length of the front wheel support. Further, in the present disclosure, after the front wheel support connectors 181 and 182 turning forwards with respect to the respective front wheel supports, the transverse brace 317 may get close to the rear wheel support transverse brace 23 and the push handle 910.

For those skilled in the art, it should be clear that, arranging the transverse braces between the front wheel support connectors, between the rear wheel supports, and between the push rods merely is a specific example, the main function of the transverse braces is to combine the side support assemblies of the two sides together to form a base frame of the stroller, and to meet a certain mechanical strength. In an alternative embodiment, the above transverse brace may only be provided with one, such as be provided between the front wheel support connectors or between the rear wheel supports, namely only with the front wheel support transverse brace 317 or the rear wheel support transverse brace 23, and the push rods of the two sides may be not connected with each other, and the top ends of the push rods of the two sides are designed to be a push handle. In an alternative embodiment, the above transverse brace may be provided with two, for example, may be provided between the front wheel supports and between the rear wheel supports, namely both the front wheel support transverse brace 317 and the rear wheel support transverse brace 23. It should be noted that, in FIGS. 1 and 2, providing the transverse brace between the push rods of the two sides (i.e., the transverse push handle 910 in FIGS. 1 and 2) at the top end of the push rod is merely a specific example, and in practice, the two ends of the transverse brace may be connected to other positions, and at this time the transverse brace only acts as a support, and in the implementation shown in FIGS. 1 and 2, the transverse brace may further serve as a push handle.

In FIGS. 1 and 2, rotatable connections of the push rods, the front wheel supports and the rear wheel supports are achieved via frame connectors of each side. In particular, the push rod formed by the pull-out push rod (11, 12, 13, 14), the front wheel support 28 and the rear wheel support 20 may be rotated with respect to each other via frame connectors 15, and the pull-out push rod (8, 7, 6, 5), the front wheel support 27 and the rear wheel support 26 may be rotated with respect to each other via frame connectors 4.

As a specific example, and as shown in FIGS. 1 and 2, each frame connector has two rotation centers, the push rod and the front wheel support may rotatably connected with the frame connector via the two rotation centers respectively, and the rear wheel support is fixedly connected with the frame connector, in particular, the pull-out push rod 14 and the front wheel support 28 are rotatably connected with the frame connector 15 via the rotation centers A2 and B2 respectively, the pull-out push rod 5 and the front wheel support 27 are rotatably connected with the frame connector 4 via the rotation centers A1 and B1 respectively, the rear wheel support 20 is fixedly connected with the frame connector 15, and the rear wheel support 26 is fixedly connected with the frame connector 4. It should be noted that, in other embodiments, alternatively, the front wheel support may be fixedly connected with the frame connector, and the rear wheel support and the push rod may be rotatably connected with the frame connector, and in this way, the relative rotation among the front wheel support, the rear wheel support and the push rod may be achieved. Of course, in other embodiments, alternatively, the push rod may be fixedly connected with the frame connector, and the front wheel support and the rear wheel support may be rotatably connected with the frame connector.

Further, the stroller also comprises a front wheel assembly and a rear wheel assembly.

Wherein, the front wheel assembly arranged at one side comprises a front wheel 1 and a front wheel connector 2 which are connected to each other, and the front wheel assembly arranged at the other side comprises a front wheel 19 and a front wheel connector 16 which are connected to each other. Wherein, the front wheel connector 2 and the front wheel support connector 181 are rotatably connected via a point C1, and the front wheel connector 16 and the front wheel support connector 182 are rotatably connected via a point C2.

The rear wheel assembly arranged at one side comprises a rear wheel 22 and a rear wheel connector 21 which are connected to each other, and the rear wheel assembly arranged at the other side comprises a rear wheel 24 and a rear wheel connector 25 which are connected to each other. Further, the rear connector 21 is rotatably connected with the rear wheel support 20, specifically via a rotation point D1; the rear connector 25 is rotatably connected with the rear wheel support 26, specifically via a rotation point D2.

Figure 3:
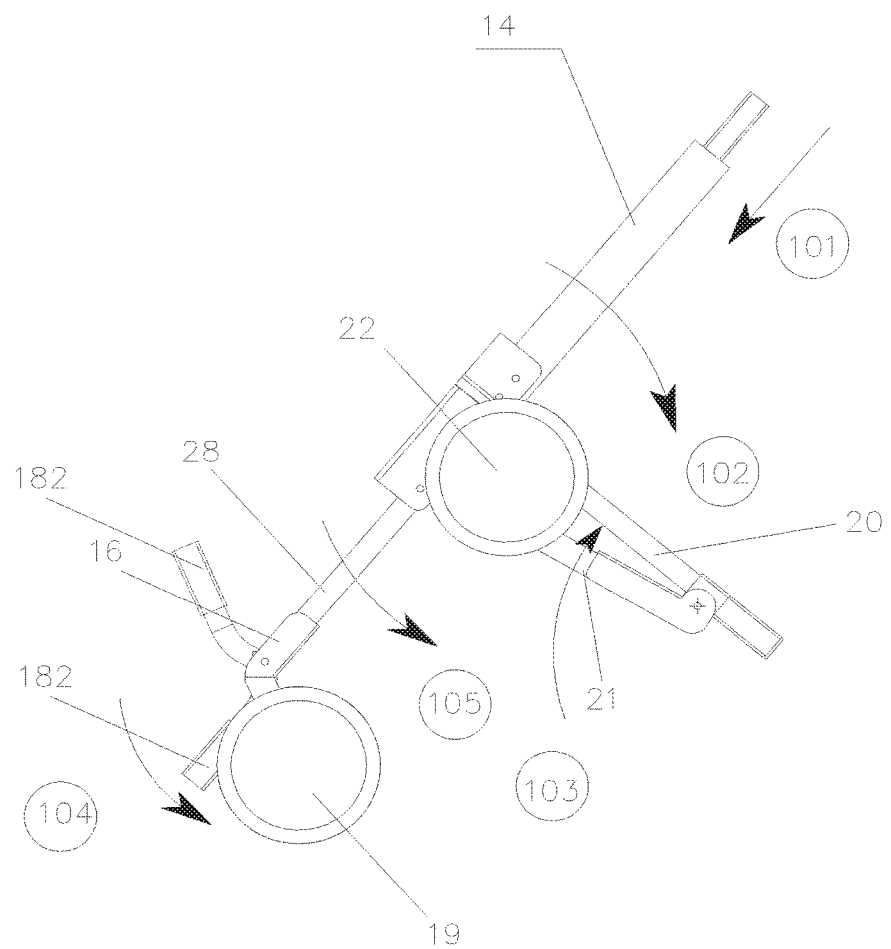
FIG. 3 is a schematic diagram of the rotating directions of respective structures of the stroller during the first folding process in the embodiment of the present disclosure.
Figure 4:
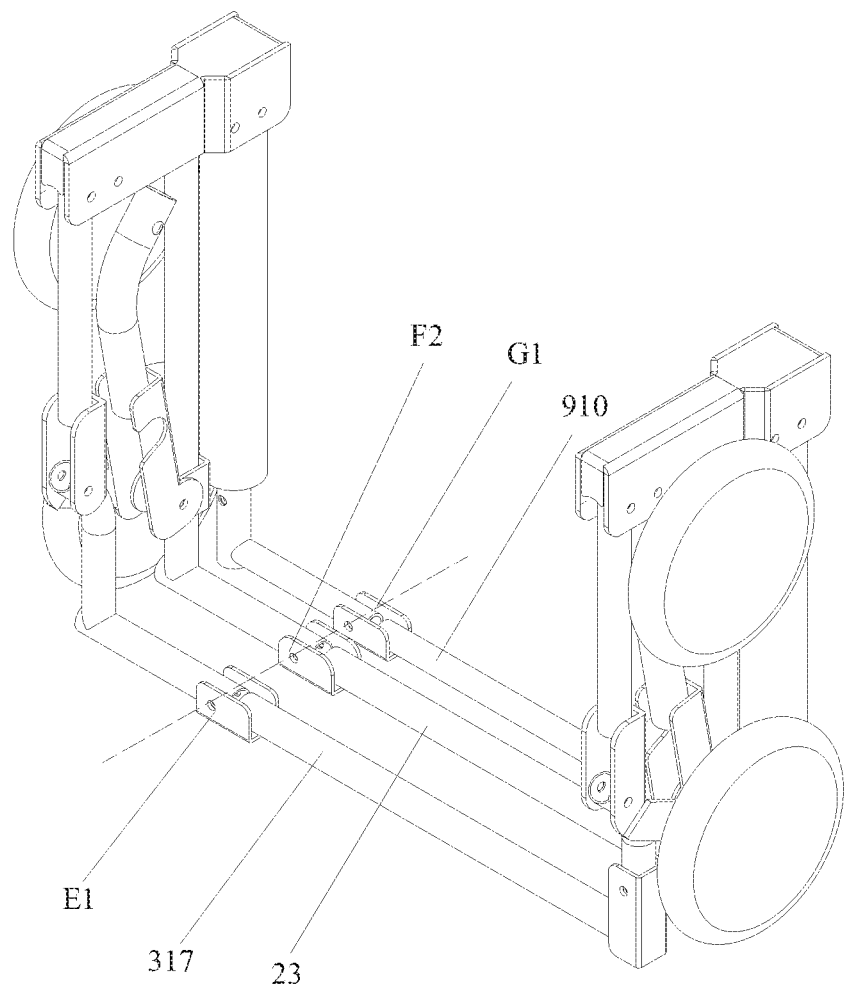
FIG. 4 is a schematic view of the stroller in the first folded state in the embodiment of the present disclosure.

The stroller of the present embodiment is capable of being folded twice so as to reduce the occupied volume in the greatest extent. In the first folded state, the push rod, the rear wheel support and the rear wheel support located at the same side are rotated to get a closed state. Referring FIG. 3 showing the schematic diagram of the rotating directions of respective structures during the first folding process, firstly the pull-out push rods located at the two side are reduced to the shortest length after being unlocked, and the pull-out push rod shown in FIG. 3 is retracted into the pull-out push rod 14 with a larger diameter along the direction of arrow 101. Then, the push rod is rotated about the rotation point A2 towards the rear wheel support 20 along the direction of arrow 102, and gets close with the rear wheel support 20, and the push rod located at the other side not shown in FIG. 3 is also rotated about a corresponding point towards the rear wheel support of the other side and gets closed. Next, the rear wheel assembly formed by the rear wheel 22 and the rear wheel connector 21 is rotated about the rotation point D1 towards the rear wheel support 20 along the direction of arrow 103, and gets close with the rear wheel support 20. Then, the front wheel connectors 181 and 182 are respectively rotated about the rotation points C1 and C2 forwards along the direction of arrow 104, to get approximately collinear with the front wheel support 27 and 28. Finally, the front wheel support 28 is rotated about the rotation point B2 towards the rear wheel support 20 along the direction of arrow 105. Thus, the front wheel assembly and the rear wheel assembly are rotated in opposite directions and get folded to be located between the front wheel support and the rear wheel support which are in the closed state, to form the first folded state as shown in FIG. 4.

To achieve the following second folding, each transverse brace has the first transverse folding rotation point and the second transverse folding rotation point, so as to rotate the side support assemblies of the two sides in the folded state via the first transverse folding rotation point and the second transverse folding rotation point to achieve the purpose of being folded twice.

Also taking the specific embodiment of the stroller in FIGS. 1 and 2 for example, a front wheel support transverse brace 317 is connected between the front wheel support connector 181 and the front wheel support connector 182, a rear wheel support transverse brace 23 is connected between the rear wheel support 26 and the rear wheel support 2520, and a transverse push handle 910 is provided between the pull-out push rods 8 and 11. When the stroller is folded into the first folded state as shown in FIG. 4, the front wheel support transverse brace 317, the rear wheel support transverse brace 23 and the transverse push handle 910 are arranged side by side. As a specific example, in the current embodiment, the first transverse folding rotation points of all transverse braces are located at ends of the transverse braces, and distances between the second transverse folding rotation points and the other ends of the transverse braces are first distances. Referring to FIGS. 1, 2 and 4, the first transverse folding rotation point G2 of the transverse push handle 910 is located at one end of the transverse push handle 910, and the second transverse folding rotation point G1 is located on the transverse push handle 910 and distances from the other end of the transverse push handle 910, and in this way, the transverse push handle 910 is divided into a first push handle section 10 and a second push handle section 9. The first transverse folding rotation point E2 of the front wheel support transverse brace 317 is located at one end of the front wheel support transverse brace 317, and the second transverse folding rotation point E1 is located on the front wheel support transverse brace 317 and distances from the other end of the front wheel support transverse brace 317, and in this way, the front wheel support transverse brace 317 is divided into a first front transverse brace section 17 and a second front transverse brace section 3. The first transverse folding rotation point F1 of the rear wheel support transverse brace 23 is located at one end of the rear wheel support transverse brace 23, and the second transverse folding rotation point F2 is located on the rear wheel support transverse brace 23 and distances from the other end of the rear wheel support transverse brace 23, and in this way, the rear wheel support transverse brace 23 is divided into a first rear transverse brace section 231 and a second rear transverse brace section 232.

When the number of the transverse braces is at least two, in the first folded state, the first transverse folding rotation points of all transverse braces are collinear or approximately collinear in a direction perpendicular to the length direction of the transverse brace, and the second transverse folding rotation points of all transverse braces are collinear or approximately collinear in a direction perpendicular to the length direction of the transverse brace. Taking the schematic diagram of the first folded state shown in FIG. 4 for example, the second transverse folding rotation point G1 of the transverse push handle 910, the second transverse folding rotation point E1 of the front wheel support transverse brace 317 and the second transverse folding rotation point F2 of the rear wheel support transverse brace 23 are collinear.

Figure 5:
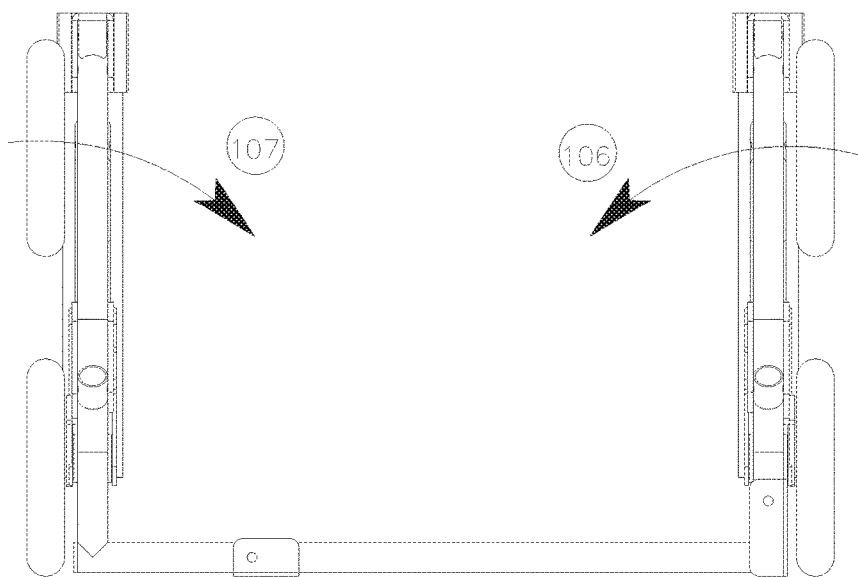
FIG. 5 is a schematic diagram of the rotating directions of respective structures of the stroller during the second folding process in the embodiment of the present disclosure.

FIG. 5 shows a schematic diagram of the movement directions of respective structures of the stroller from the first folded state to the second folded state in the current embodiment. As shown in FIG. 5, the side support assemblies of the two sides are rotated along the directions of arrow 106 and arrow 107 shown in FIG. 5 respectively, wherein, the rotation point about which the side support assembly of the side is rotated along the direction of arrow 106 is at an end of the transverse brace, and in the present embodiment, is the first transverse folding rotation point of respective transverse brace; the rotation point about which the side support assembly of the side is rotated along the direction of arrow 107 is the second transverse folding rotation point of respective transverse brace.

Figure 6:
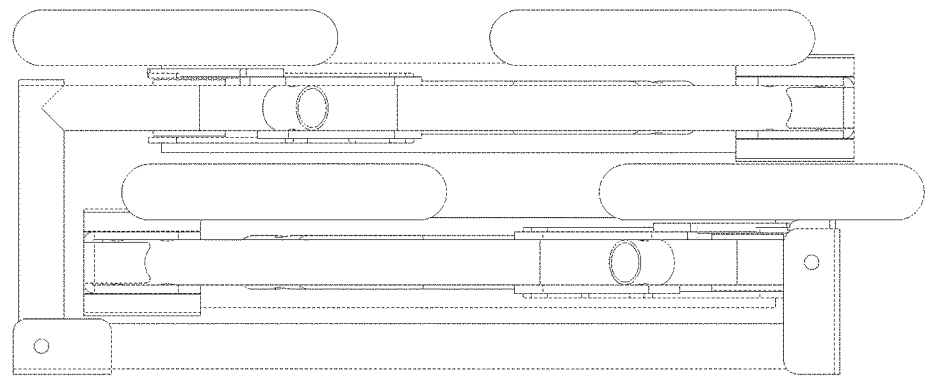
FIG. 6 is a schematic view of the stroller in the second folded state in the embodiment of the present disclosure.
Figure 7:
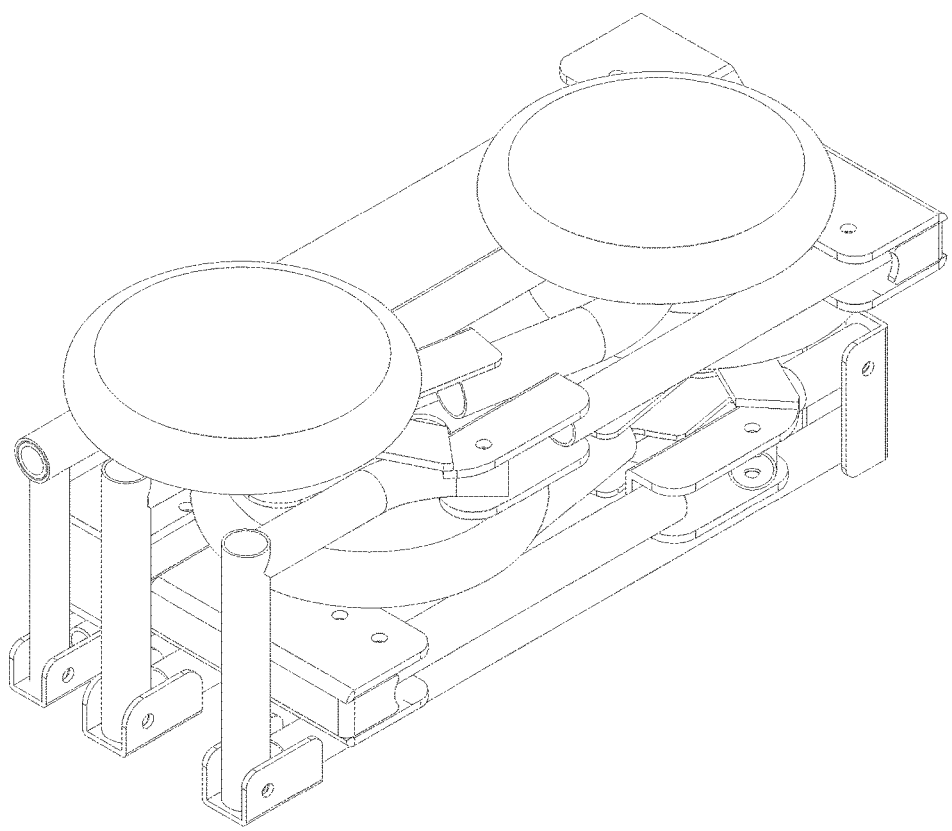
FIG. 7 is a schematic view of the stroller in FIG. 6 from another angle.

FIG. 6 shows a schematic view of the stroller in the second folded state in the present embodiment, FIG. 7 shows a schematic view of the stroller in the second folded state from another viewing angle, and from FIGS. 6 and 7, it can be seen that, the push rod, the front wheel support and the rear wheel support located beside the first transverse folding rotation point are rotated to get folded and close to the transverse brace, while the push rod, the front wheel support and the rear wheel support located beside the second transverse folding rotation point are rotated to get folded and close to the push rod, the front wheel support and the rear wheel support located beside the first transverse folding rotation point. That is to say, it is achieved that, the side support assembly located beside the first transverse folding rotation point is rotated to get folded below, while the side support assembly located beside the second transverse folding rotation point is rotated to get folded above the side support assembly located beside the first transverse folding rotation point, and finally, a folded structure with three layers is formed.

It should be noted that, in other embodiments of the present disclosure, the first transverse folding rotation point and the second transverse folding rotation point of the transverse may be located at the two ends of the transverse brace, respectively, and in this way, the side support assemblies of the two sides in the first folded state are rotated about the first transverse folding rotation point and the second transverse folding rotation point respectively to get folded and get close to each other in opposite directions. In order to minimize the volume after being folded, after the side support assemblies of the two sides in the present disclosure are rotated about the first transverse folding rotation point and the second transverse folding rotation point respectively to get folded, both the side support assemblies of the two sides contact with the transverse brace, namely, forming a folded structure with two layers.

In another embodiment of the present disclosure, both the first transverse folding rotation point and the second transverse folding rotation point of the transverse brace are located between two ends of the transverse brace, namely, located at positions not the ends. The side support assemblies of the two sides in the first folded state may achieve getting folded in opposite directions by being rotated about the first transverse folding rotation point and the second transverse folding rotation point respectively. In the present embodiment, the first transverse folding rotation point and the second transverse folding rotation point may distance the respective adjacent ends for an equal distance, and the length of the transverse braces are enough to cause the formation of a folded structure with two layers after the side supports of the two sides are folded in opposite directions. Of course, in order to minimize the volume after being folded, distances from the first transverse folding rotation point and the second transverse folding rotation point to the adjacent ends of the transverse braces maybe unequal, the side support assemblies of the two sides are rotated about the first transverse folding rotation point and the second transverse folding rotation point respectively to get folded in a folded state presenting three layers, the side support assemblies of the two sides contact with each other in an up-down direction, and the angle between a transverse brace section between the transverse folding rotation point distancing the adjacent end farther and the corresponding adjacent end and a transverse brace section between the first transverse folding rotation point and the second transverse folding rotation point is not more than 90°.

Thus, the strollers provided by the embodiments of the present disclosure are capable of achieving not only a first folding, but also a second folding of the two side support assemblies, so as to reduce the volume occupied by the entire stroller in these states.

The above description is only preferable implementations of the present disclosure, and it should be noted that, for those ordinary skilled in the art, many improvements or modifications can be made without depart from the technical principle of the present disclosure, and those improvements and modifications should be covered by the protective scope of the present disclosure.

The invention claimed is:

1. A stroller that folds twice, wherein, the stroller comprises: side support assemblies located at two sides and at least one transverse brace connected between the side support assemblies of the two sides, the side support assembly of each side comprises a push rod, a front wheel support and a rear wheel support which are rotatably connected to each other, each transverse brace has a first transverse folding rotation point and a second transverse folding rotation point; and when the side support assembly is in a first folded state, the push rod, the front wheel support and the rear wheel support located at the same side are rotated to be in a closed state, and the side support assemblies of the two sides in the first folded state are rotated about the first transverse folding rotation point and the second transverse folding rotation point respectively to get folded and get close to each other in opposite directions.

2. The stroller according to claim 1, wherein, the first transverse folding rotation point of the transverse brace is located at an end of the transverse brace, and the second transverse folding rotation point is located between two ends of the transverse brace.

3. The stroller according to claim 2, wherein, the side support assemblies of the two sides in the first folded state are rotated about the first transverse folding rotation point and the second transverse folding rotation point in opposite directions respectively to get folded to a second folded state, and in the second folded state, the side support assembly of one side is rotated about the first transverse folding rotation point to get folded and get close to the transverse brace, and the side support assembly of the other side is rotated about the second transverse folding rotation point to get folded and get close to the side support assembly of the one side.

4. The stroller according to claim 1, wherein, the first transverse folding rotation point of the transverse brace is located at an end of the transverse brace, and the second transverse folding rotation point is located at the other end of the transverse brace.

5. The stroller according to claim 4, wherein, the side support assemblies of the two sides in the first folded state are rotated about the first transverse folding rotation point and the second transverse folding rotation point in opposite directions respectively to get folded to a second folded state, and in the second folded state, the side support assembly of one side is rotated about the first transverse folding rotation point to get folded and contact with the transverse brace, and the side support assembly of the other side is rotated about the second transverse folding rotation point to get folded and contact with the transverse brace.

6. The stroller according to claim 1, wherein, both the first transverse folding rotation point and the second transverse folding rotation point of the transverse brace are located between two ends of the transverse brace.

7. The stroller according to claim 6, wherein, distances from the first transverse folding rotation point and the second transverse folding rotation point to adjacent ends thereof are unequal, and the angle between a transverse brace section between the transverse folding rotation point distancing the adjacent end farther and the corresponding adjacent end, and a transverse brace section between the first transverse folding rotation point and the second transverse folding rotation point is not more than 90°.

8. The stroller according to claim 2, wherein, the number of the transverse braces connected between the side support assemblies of the two sides is at least two, and in the first folded state, the first transverse folding rotation points of all transverse braces are collinear in a direction perpendicular to the length direction of the transverse brace, and the second transverse folding rotation points of all transverse braces are collinear in a direction perpendicular to the length direction of the transverse brace.

9. The stroller according to claim 1, wherein,
a transverse brace is connected between the front wheel supports of the two sides; and;
a transverse brace is connected between the rear wheel supports of the two sides; and;
a transverse brace is connected between the push rods of the two sides.

10. The stroller according to claim 1, wherein, the side support assembly of each side further comprises a front wheel support connector of which an end is rotatably connected with a front end of the front wheel support, and a transverse brace is connected between the other ends of the front wheel support connectors of the two sides.

11. The stroller according to claim 10, wherein, in the first folded state, the front wheel support connector is turned forwards with respect to the front wheel support.

12. The stroller according to claim 1, wherein, the stroller further comprises a front wheel support and a rear wheel assembly rotatably connected with the rear wheel support, and in the first folded state, the front wheel assembly and the rear wheel assembly are rotated in opposite directions and get folded to be located between the front wheel support and the rear wheel support which are in the closed state.

13. The stroller according to claim 1, wherein, the push rod is a stretchable push rod.

14. The stroller according to claim 1, wherein, the push rod, the front wheel support and the rear wheel support of each side are connected via a frame connector, and at least two of the push rod, the front wheel support and the rear wheel support of each side are rotatably connected with the frame connector.

15. The stroller according to claim 4, wherein, the number of the transverse braces connected between the side support assemblies of the two sides is at least two, and in the first folded state, the first transverse folding rotation points of all transverse braces are collinear in a direction perpendicular to the length direction of the transverse brace, and the second transverse folding rotation points of all transverse braces are collinear in a direction perpendicular to the length direction of the transverse brace.

16. The stroller according to claim 6, wherein, the number of the transverse braces connected between the side support assemblies of the two sides is at least two, and in the first folded state, the first transverse folding rotation points of all transverse braces are collinear in a direction perpendicular to the length direction of the transverse brace, and the second transverse folding rotation points of all transverse braces are collinear in a direction perpendicular to the length direction of the transverse brace.

17. The stroller according to claim 9, wherein, the stroller further comprises a front wheel support and a rear wheel assembly rotatably connected with the rear wheel support, and in the first folded state, the front wheel assembly and the rear wheel assembly are rotated in opposite directions and get folded to be located between the front wheel support and the rear wheel support which are in the closed state.

18. The stroller according to claim 9, wherein, the push rod is a stretchable push rod.

19. The stroller according to claim 9, wherein, the push rod, the front wheel support and the rear wheel support of each side are connected via a frame connector, and at least two of the push rod, the front wheel support and the rear wheel support of each side are rotatably connected with the frame connector.

* * * * *